March 1, 1966 H. D. CRANE 3,238,504

SIGNAL TRANSMISSION SYSTEM

Filed Oct. 17, 1960 7 Sheets-Sheet 1

INVENTOR.
HEWITT D. CRANE

BY Lyon & Lyon
ATTORNEYS

INVENTOR.
HEWITT D. CRANE
BY Lyon & Lyon
ATTORNEYS

March 1, 1966 H. D. CRANE 3,238,504

SIGNAL TRANSMISSION SYSTEM

Filed Oct. 17, 1960 7 Sheets-Sheet 3

INVENTOR.
HEWITT D. CRANE
BY
Lyon & Lyon
ATTORNEYS

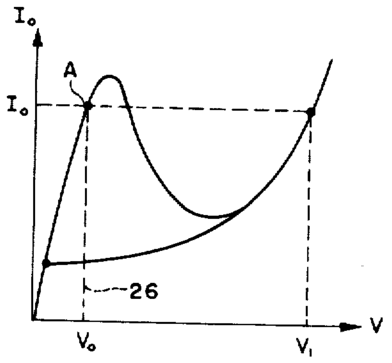
FIG. 12.
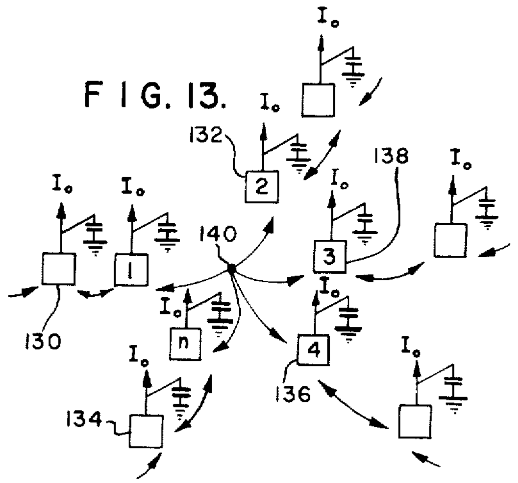
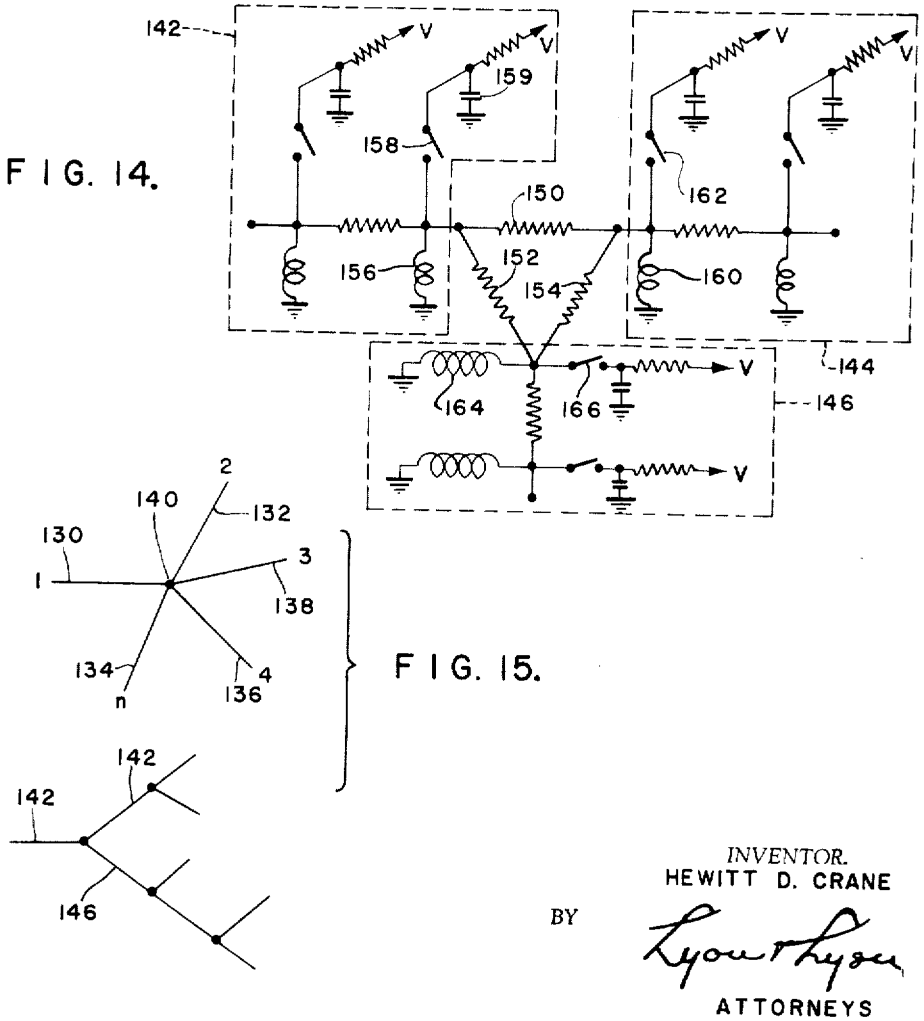
FIG. 14. FIG. 15.
INVENTOR.
HEWITT D. CRANE
BY
Lyon & Lyon
ATTORNEYS March 1, 1966 H. D. CRANE 3,238,504

SIGNAL TRANSMISSION SYSTEM

Filed Oct. 17, 1960

7 Sheets-Sheet 5

INVENTOR.
HEWITT D. CRANE

BY Lyon & Lyon
ATTORNEYS

March 1, 1966 H. D. CRANE 3,238,504

SIGNAL TRANSMISSION SYSTEM

Filed Oct. 17, 1960 7 Sheets-Sheet 6

INVENTOR.
HEWITT D. CRANE

BY [signature]

ATTORNEYS

March 1, 1966

H. D. CRANE 3,238,504

SIGNAL TRANSMISSION SYSTEM

Filed Oct. 17, 1960

7 Sheets-Sheet 7

INVENTOR.
HEWITT D. CRANE

BY Lyon & Lyon
ATTORNEYS

United States Patent Office 3,238,504
Patented Mar. 1, 1966

3,238,504

SIGNAL TRANSMISSION SYSTEM

Hewitt D. Crane, Palo Alto, Calif., assignor to The Board of Trustees of The Leland Stanford, Jr., University, Stanford, Calif., a corporation of California Filed Oct. 17, 1960, Ser. No. 63,188
26 Claims. (Cl. 340—172.5)

This invention relates to improvements in electrical devices and apparatus for performing logical functions.

The human nervous system appears to operate in a manner to provide relatively long-range electrical communications without the availability of a good conducting means. This is achieved by using nerve fibers or neurons. A method of signaling is by pulse propagation. In the "resting" state, i.e., when not passing pulses, there exists a "resting" potential between the inside and the outside of a nerve fiber, i.e., across the nerve membrane, which has been found to be on the order of 75 millivolts. This resting potential is postulated as deriving from a metabolic "sodium-potassium pump" process, by means of which sodium is maintained at a higher concentration on the outside of the fiber, and potassium at a higher concentration inside the fiber.

The relations of the transverse and axial resistances of a nerve fiber are such that if a small D.C, potential is established at some point along the fiber (by a small electric probe) then a profile of potential versus distance from that point reveals that the D.C. signal voltage drops to one-half of the impressed value at a distance on the order of one millimeter from the point. If the D.C. potential on the probe is increased, after a certain voltage is reached, a discharge process develops that propagates away from the exciting point in both directions. The discharge wave continues without attenuation to the ends of the fiber, regardless of its length. This wave is referred to as a discharge wave because the wavefront, as it passes any particular point, is associated with a discharge of the potential stored at that point with a subsequent release of some stored energy. It is the release of this energy that keeps the wave propagating without attenuation. The discharge wavefront moves at a "characteristic" velocity which is on the order of one to a hundred meters per second, depending on nerve size and position in the nervous system. A most important property of the discharge is what physiologists refer to as the "refractory" period following the passage of a pulse. During this period, which is typically one to several milliseconds long, it is not possible to initiate another discharge wave.

It may be stated at this time that it is not the purpose here to develop any system of logic which has any direct relation to the organization of the human nervous system. However, in summary, transmission along the axon of a nerve fiber has the following typical properties. It is generally in a resting state characterized by a D.C. potential of approximately 75 millivolts across the nerve membrane. When stimulated at any point along its length, two discharge waves propagate away from the stimulating point, one in either direction, traveling with a uniform velocity (on the order of one to a hundred meters per second), and without decay, to the ends of the fiber. The passage of a propagating wave is accompanied by a refractory period, typically one to several milliseconds' duration, during which time the fiber cannot again be excited.

An object of this invention is to provide a transmission line from circuit components along which signals may propagate, which transmission line has the properties of threshold stimulatability, attenuationless propagation, characteristic velocity of propagation, and a refractive period.

Another object of this invention is to provide a transmission line made up of unique signal propagating elements.

Another object of this invention is the provision of novel logic circuit components employing transmission lines of the type described.

These and other objects of the invention may be achieved by the provision of novel elements which, when connected together, provide a communication channel or transmission line having these properties of threshold stimulatability, attenuationless propagation, characteristic velocity of propagation, and a refractive period. An element in accordance with this invention will be referred to hereafter as a "neuristor." Each neuristor comprises a means for storing a predetermined amount of energy, a means for charging with energy said means for storing energy, and a means for releasing said stored energy over a predetermined interval responsive to a signal exceeding a predetermined threshold. Said means for releasing energy also not being operable until said means for storing a predetermined amount of energy has again stored said predetermined amount of energy. A plurality of these neuristor elements are coupled to provide a transmission line for propagating signals. This line can either propagate signals from either end or from any point in between the ends, out to both ends, or can propagate signals in one direction only, if desired. By interconnecting signal-propagating lines made up of neuristor elements which are in arrangements to be described subsequently herein, which take advantage of the unique properties of these lines, various different types of logic can be implemented.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 12 is a wave shape drawing illustrating tunnel diode characteristics;

FIGURE 13 is a drawing illustrating how elements in accordance with this invention may be interconnected to a T junction;

FIGURE 14 is a drawing illustrating how the embodiment of the invention shown in FIGURE 10 may be interconnected for obtaining a T junction;

FIGURE 15 is a schematic drawing illustrating various T junction possibilities;

FIGURE 24A is constructed from four of the structures shown in FIGURE 23B;

Neuristors may be analogized to a fuse of the type which is used to ignite powder. A certain temperature must be exceeded before the fuse can be ignited. It burns at a steady rate. The fuse does not have the property of self-healing, but, if it did, it could constitute a fairly good analogy of the proposed basic neuristor element.

Figure 1:
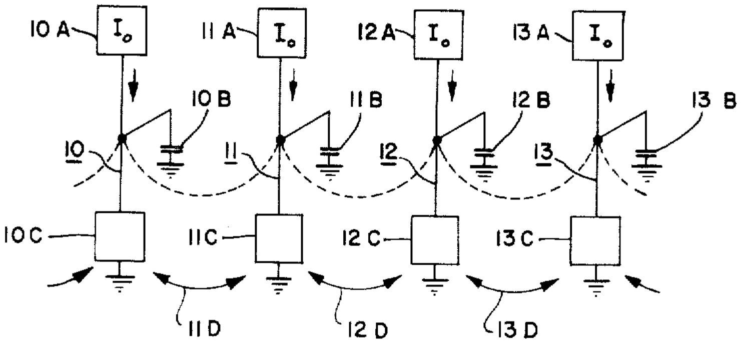
FIGURE 1 is a schematic drawing of a plural-element or transmission line embodiment of the invention, which is shown to illustrate and afford a better understanding of this invention.

Attention is now drawn to FIGURE 1, which is a schematic drawing illustrating the basic concept of this invention. FIGURE 1 represents a chain of bilaterally coupled monostable circuits 10, 11, 12, and 13, each of which may be designated as a neuristor element. Each monostable circuit includes an energy source $I_0$, respectively 10A, 11A, 12A, and 13A, an energy storage device, respectively 10B, 11B, 12B, and 13B, and a potentially active device 10C, 11C, 12C, and 13C. A bilateral triggering coupling exists between adjacent devices, as represented by the arrows 11D, 12D, 13D. Let it be assumed that the active device (10C through 13C) is a block of thermistor material, whose steady-state characteristics are indicated by the voltage-current curve 20, shown in FIGURE 2. This curve can be determined experimentally by connecting a block of thermistor material to a current source and measuring the voltage thereacross as the current is increased from zero. After each change of current, sufficient time is allowed for re-establishment of equilibrium before the next increase of current is made.

Because of the thermal capacity of the thermistor material, after any change of current it takes some time for the temperature to restabilize to its new value. For every point on the steady-state voltage-current curve there is associated a current, voltage, resistance, and temperature. The product of the current and voltage determines the power dissipated in the material, which is exactly the power required to keep the material at the corresponding temperature. The quotient of the voltage and current determines the corresponding bulk resistance of the material at the temperature. Thermistor material can be "triggered" from a steady-state position, either thermally, by applying heat thereto, in which event its resistance changes to some new value, or by changing the current flowing therethrough from a steady-state value to a new value. By the combination of a temperature source and current source, essentially every point of the voltage-current plane represents a possible operating point of the thermistor material. The application of a temperature source to the thermistor material block determines a radial line (whose slope depends on the resistance of the material corresponding to that temperature) on which the operating point for the material lies, and a current source determines the radial distance of the operating point from the origin.

Figure 2:
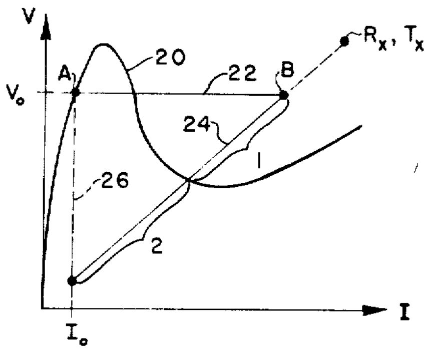
FIGURES 2 and 3 are drawings illustrating the general characteristics of an active device in the chain of devices which is shown in FIGURE 1.

The curve of FIGURE 2 illustrates the general characteristics for a single one of the devices shown as a chain in FIGURE 1. Assume that in equilibrium the capacitor current for any one of the elements is zero and the source current $I_0$ results in a thermistor voltage $V_0$. Without a capacitor any attempt at thermal triggering by applying a thermal source to the thermistor material would merely result in the operating point moving vertically downward along the constant line $I_0$, such operation being of no special interest. With a capacitor present, however, high currents may be made to flow in the thermistor by proper triggering.

With the current $I_0$ being applied to the thermistor material, it is in equilibrium at point A on the curve 20. Assume that a temperature source having a temperature $T_X$ is rapidly applied to the thermistor material. The operating point of the material moves instantaneously from point A to point B along the line 22 due to the instantaneous change in the resistance value to the value $R_X$. The capacitor connected across the thermistor material will then discharge into a constant resistance $R_X$. The dynamic voltage-current curve for this portion of the discharge lies along the radial 24 of slope determined by $R_X$, the capacitor discharge terminating at a point C, which is on the line 24 corresponding to the $I_0$ line. In the region 1 above the steady-state voltage-current curve, heat will be delivered to the thermal source from the thermistor material. In the region 2 below the voltage-current curve, heat will be delivered from the thermal source to the thermistor material.

Figure 3:
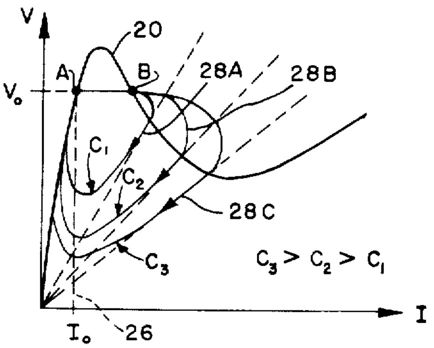

If the thermal triggering source is removed from the thermistor material as soon as the operating point of the material enters its active region, then a dynamic V–I curve of the type shown in FIGURE 3 is obtained. Again, discussing a single one of the elements shown in FIGURE 1, the current source $I_0$ provides current for the thermistor element establishing its equilibrium point at A on the curve 20. At equilibrium an associated capacitor is charged, and no current is flowing therethrough. The thermal triggering source is removed from the thermistor material as soon as the operating point of the thermistor material has reached its active region, which is the region above the steady-state voltage-current curve. Thus the thermal source causes the operating point to move instantaneously from A to B, at which time it is removed. The exact analytic expression for the dynamic voltage-current curve represented by the curves 28A, 28B, 28C, for three different values of capacitors, after the thermal triggering source is removed, is complex because of the nonlinear relations. However, two simple observations can be made which make the form of the curve relatively clear:

First, whenever the thermistor current is greater than the magnitude of the current source $I_0$, the capacitor is discharging, and the voltage is falling. For thermistor current less than the current source $I_0$, the capacitor is charging and the voltage across the thermistor is rising.

Second, if at any instant the operating point of the thermistor element is above the steady-state voltage-current curve, then the dynamic curve has a clockwise component of motion with respect to the origin. For an operating point below the voltage-current curve, the dynamic curve has a counterclockwise component of motion. As the dynamic curve crosses the steady-state current-curve, it has therefore only a radial component of motion.

It is believed that by combining the arguments above, the form of the dynamic curves in FIGURE 3 is clear. It is also intuitively clear that the larger the value of capacitance, the larger the initial store of energy at voltage $V_0$, and hence the larger the excursion of the dynamic discharge curve, as indicated in the figure.

Reference is again made to FIGURE 1. Assume that all the elements 10C, 11C, 12C, 13C, etc., are thermally, but not electrically, coupled, as represented by the arrows 11D, 12D, 13D. After the elements in the chain have all reached their equilibrium conditions, which, as previously defined, exists when there is no further current flowing into the capacitors but when there is the current $I_0$ from the respective sources 10A through 13A flowing through the thermistor elements 10C through 13C, a thermal triggering source having a temperature $T_1$ is applied to the element 10C to enable it to make an excursion of the type represented in FIGURE 3. Attention is called to FIGURE 4, which is a drawing illustrating the active characteristics of the chain of neuristor elements shown in FIGURE 1. Thus, the steady-state curve 20 of the neuristor material is reproduced in FIGURE 4. Also shown is the $I_0$ line 26.

Upon the application of the thermal triggering source at temperature $T_1$ to the material 10C of the first element 10, the thermistor material is substantially instantly brought to the temperature $T_1$ along the curve 30. The capacitor 10B commences discharging through the thermistor material, and the dynamic characteristic of the material follows along the radial 32 until it reaches the $I_0$ line, from which point it will return to point A on cure 20 if $T_1$ is removed.

Figure 4:
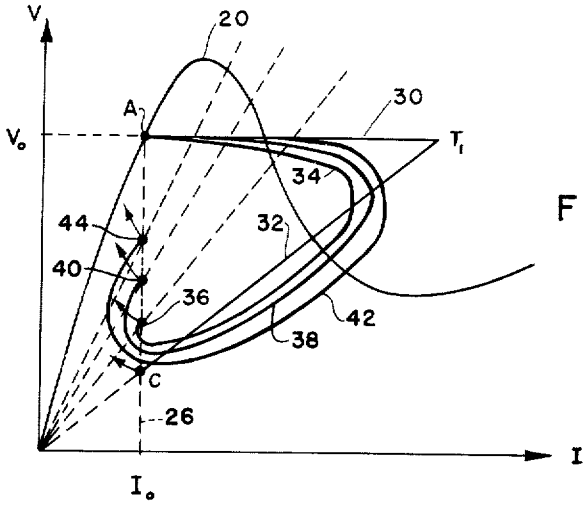
FIGURE 4 is a drawing illustrating the general behavior characteristics of the chain of devices shown in FIGURE 1.

Assuming that the temperature $T_1$ and the thermal coupling of the transistor material 10C to the material 11C are adequate, the temperature rise in the second unit is more than sufficient to trigger it, and the discharge portion of its dynamic switching curve will resemble the curve 34 in FIGURE 4. The terminal point of the switching curve for the element 11 will not be at point C, but rather at a point determined by the magnitude of the current source $I_0$ and the steady-state temperature $T_2$, which results from the presence of source $T_1$, which is applied to the material 10C. This terminal point of the switching curve is labeled by the reference numeral 36 on FIGURE 4. Thus, in succession, element 11 can trigger element 12, element 12 can trigger element 13, and so on. The dynamic characteristic curves of elements 12 and 13 are respectively represented by the curve 38 with terminal point 40 and curve 42 with terminal point 44.

The triggering of the elements 12, 13, and 14 occurs in succession. It should be noted, however, that the terminal point of each succeeding curve is higher, due to the lower steady-state temperature resulting from the greater distance from the source $T_1$. Hence, it may be concluded that as a result of the application of the thermal triggering source $T_1$, a single propagating discharge wave is generated. To initiate the discharge, the magnitude of the temperature trigger has to be greater than some minimum value. Thus, the first specified neuristor property, relating to threshold stimulatability, is clearly satisfied by the circuit of FIGURE 1. The second and third properties, relating to attenuationless propagation, and propagation with uniform velocity, are also clearly satisfied, since, once the wavefront has moved a sufficient distance from the triggering source so that the direct effect of the latter is negligible, then each portion of the line behaves in identical fashion as the wave passes by it.

The fourth property relating to a refractory period is yet to be demonstrated. It should be recalled that in the previous discussions of nerve propagation, the refractory period followed the passage of a wave and was described as the period during which it is impossible to initiate a second wave, regardless of the triggering strength. This may be shown to be the case for the circuit shown in FIGURE 1, also.

Consider all elements of the coupled chain to be in equilibrium at point A, correseponding to $V_0$, $I_0$. To insure the generation of a propagating pulse, the thermal triggering source $T_1$ must be connected to the first element only until its temperature is raised sufficiently to move its operating point into its active region. From then on, the discharge continues "on its own." If, during any portion of the discharge of element 10, the thermal source is reconnected, its only effect can be to control the specific motion of the dynamic operating point during the discharge. In no way, however, can it stop the discharge nor hold the wave already propagating along the structure, nor trigger a second propagating wave. The latter remarks are true, even if the thermal source is reconnected with a much higher temperature. This demonstrates the existence of a refractory period.

To estimate the duration of the refractory period, assume again that the triggering source is connected to the line and that it remains there. As a result of the triggering, a single propagating wave is generated, and the operating points of all elements of the chain finally end up at the terminal points indicated in connection with FIGURE 4. If the triggering source $T_1$is now removed, the operating points of all elements go back to the equilibrium point A. It should be noted that the switching curves all lie to the left of the constant line $I_0$, indicating that associated capacitors are charging. This recharging condition does not lead to retriggering of the line. If the triggering source is again applied shortly after its release from the first element, but before any of the operating points have a chance to move very far, then all operating points move somewhat to the right of the constant $I_0$ line, indicating capacitor discharge, and then return again to the initial set of terminal points 36, 40, 44. Hence, during the time from the first release of the triggering source to establishment of a steady state after its reapplication a short time later, each operating point experiences a small, closed-loop excursion. If the triggering source is not released for a sufficient time to allow adequate rebuilding of the storage levels, however, the subsequent excursions of the operating points upon reconnection of the trigger source are insignificant with regard to initiating a new discharge. Clearly, then, the refractory period lasts until the line has a chance to recharge to some minimum level.

To sum up the above observations, it is clear that, once a propagating discharge wave is initiated by a thermal triggering source, no manner of subsequent connection or release of the source can halt the progress of the wave. Furthermore, to start a second propagating discharge wave, the trigger source must actually be removed for some minimum (refractory) period before being reapplied. The main consequence of the refractory period relates to the property of pulse collision in a chain of elements, wherein two pulses approaching each other on a single chain disappear upon collision due to the lack of energy on either side of the collision point.

One other important property of the discharge described needs mentioning. In FIGURE 4, the discharge curves for the respective stages are shown as reaching a higher temperature than the thermal triggering source $T_1$. However, if $T_1$ were sufficiently higher, the maximum temperatures reached by the following stages would actually be less than $T_1$. The key observation is that for a given set of line parameters, including the level of stored energy, there is some steady-state (dynamic) curve that is characteristic of the discharge, and is traced out in time succession by each stage. For a small $T_1$, but large enough to successfully trigger the first stage, the discharge builds up (in terms of maximum discharge temperature); for a large $T_1$, the discharge builds down to steady state.

In the discussion in connection with FIGURE 4, it was assumed that there was close thermal coupling between thermistors, but no electrical coupling. This condition is represented by the embodiment of the invention shown in FIGURE 1. Under these conditions, each individual circuit can be expected to respond in the postulated discharge-recovery mode, and, with a sufficiently tight thermal coupling from stage to stage, a wave, once initiated, propagates without attenuation along the line.

Figure 5:
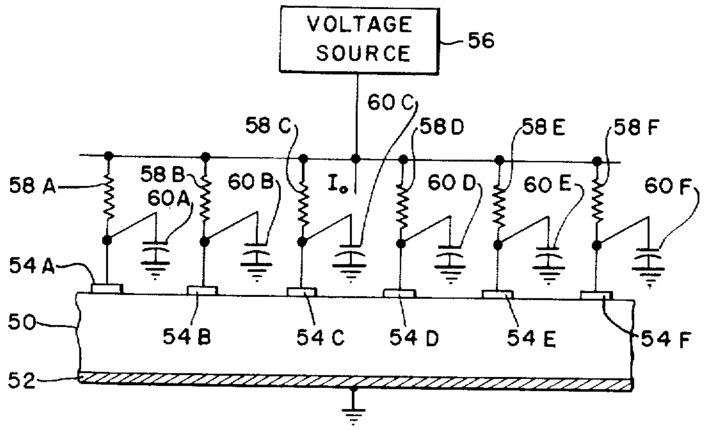
FIGURE 5 is a schematic drawing of an embodiment of the invention having electrical as well as thermal coupling.

Reference is now made to FIGURE 5, which is an embodiment of the invention having interstage electrical as well as thermal coupling. A bar of material 50, which may be thermistor material or material having similar properties, has a common electrode 52 on one side thereof and a plurality of spaced electrodes 54A through 54F on the opposite side thereof. A common voltage source 56 feeds a common bus which is connected to each one of the electrodes 54A through 54F through a separate resistor 58A through 58F. A separate capacitor 60A through 60F is connected between the respective electrodes 54A through 54F and ground. The combination of the voltage source 56 and resistors 58A through 58F are analogous to providing the required current source $I_0$ for charging up each one of the capacitors 60A through 60F and for applying constant current to the block of thermistor material 50 by the medium of the electrodes 54A through 54F and the opposed electrode 52.

As a first approximation, the material under each electrode can be thought of as forming the active element of that stage. Assume that the voltage drop across an active element is uniformly distributed (vertically). If two adjacent elements are at a different potential, then the sign of the potential difference between the elements is the same at every horizontal level, and lateral currents flow in the same direction at each level, although the magnitude of current is different at each level. Of course, the actual flow of lateral current tends to destroy the uniform distribution of voltage across each element, but that may be neglected here.

Figure 6:
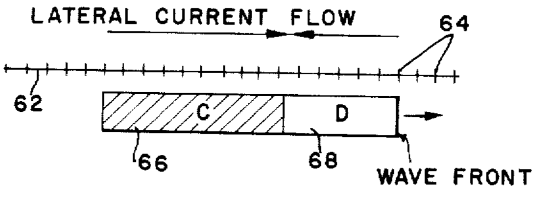
FIGURE 6 is a symbolic representation of conditions in the embodiment of the invention shown in FIGURE 5 during an operating cycle.

Assume that a wave is traveling to the right. Each circuit successively passes through the same discharge and charge history as its neighbors, but at a slightly different time. Assume that the "*n*th" stage is discharging (its voltage falling). During the discharge, the voltage of the "*n*th" element is lower than the voltage of its neighbor to the right, so that there is a lateral current flow from right to left. When the "*n*th" element is charging (voltage building up), its voltage is higher than the voltage of its right-hand neighbor, and a lateral current will flow to the right. This situation may be represented in the manner shown in FIGURE 6, which symbolically represents the conditions stated. The structure of the invention is indicated by a single line 62, with small vertical line segments 64, indicating the position of the individual lumped circuits. Assuming some of the circuits are in various states of discharge D, and those of a different portion are in various states of charge C, this may be represented by the two adjacent rectangles, respectively 68 and 66, wherein rectangle 66 is shaded and bears the letter C, indicating the regions in various states of charge, and the rectangle 68 bears the letter D, and is not shaded and exemplifies the regions of the line which are in various states of discharge. The arrow at one side of the rectangle 68 indicates the direction of propagation of the wavefront.

In accordance with the preceding discussion, in the situation represented by the rectangles 66 and 68, a lateral current flows to the left in the discharge region, and another current flows to the right in the charge region. The effects that these lateral currents have on the operation of the device will now be considered. First, consider the possibility of connecting all storage capacitors together. In analogy to the linear transmission of electromagnetic radiation, where two variables (electric field and magnetic field) are so related that the change with respect to time of either "generates" the other, so too, in a discharge wave propagating along the nonlinear line, two variables are similarly related. In the present situation, the variables are the trigger strength, T, and the energy storage level, S, at any instant and at any position along the line. The wave can be visualized as moving by an alternate action of energy discharge, which creates an increase in trigger strength, which in turn causes an additional energy discharge, and so forth. The two wave variables, namely, triggering variable and storage variable, present here, will be hereafter represented by T for triggering variable and S for storage variable.

By requiring the presence of both components in the traveling wave, the possibility of short-circuiting all energy storage capacitors together (as represented by the dashed lines in FIGURE 1) is immediately ruled out. These connections would have the effect of shorting out the S, or energy storage, component, since all elements would experience the same voltage at every instant. This raises the question as to how much, or rather how little, resistance can be tolerated between capacitor elements as indicated in FIGURE 1. It should be noted that both the S and the T variables primarily satisfy a diffusion equation. The voltage along a distributed RC line satisfies the equation $$\frac{d^2V}{dx^2}=(RC)\left(\frac{dV}{dt}\right)$$

Tte temperature along a uniform thermal line satisfies the equation $$\frac{d^2T}{dx^2}=\left(\frac{C_T}{K}\right)\left(\frac{dT}{dt}\right)$$

where K is the thermal conductivity per unit length and $C_T$ is the thermal capacity per unit length.

To maintain the wave propagation, each stage must be triggered at a time when it is still sensitive to triggering; that is, it must have a sufficiently high level of stored energy. Consider that the "*n*th" stage of the chain has just fired. This implies that at that position the voltage is decreasing (decreasing S) and the temperature is increasing (increasing T, where temperature is the trigger). In order to effectively fire the $(N+1)^{ST}$ element, the T component must effectively reach that element first, to insure its finding a high level of energy storage. Thus, a higher diffusion rate in the thermal circuit is necessary, so that $K/C_T$ is greater than $1/RC$, where all quantities are expressed in compatible units of conductivity and capacitance. This, then, defines an order of magnitude lower limit on the value of resistance that may be connected from capacitor to capacitor.

In the case of the structure of FIGURE 5, the resistance between adjacent capacitors is not as explicit as it was in FIGURE 1. There are two important differences. First, in FIGURE 5 the resistive connection is nonlinear (thermistor material). Second, any heat dissipation in the connecting resistance actually helps propagate the discharge (increases the T variable), whereas in the structure of FIGURE 1, all resistive heat is lost. Thus, when the "*n*th" discharge occurs, it heats the material under the "*n*th" electrode. By thermal diffusion, the material between the "*n*th" and the $N+1$ element is heated, and its resistivity falls. As a result, a transverse current flows, supplied from the capacitance of the $N+1$ stage. This can be viewed as an intermediary discharge, which helps heat (trigger) the $N+1$ stage. If some average resistance value could be assigned to the intermediary discharge, the minimum requirement for maintaining the discharge would be a value of storage capacitor large enough so as not to be significantly discharged by the intermediary discharge. This, again, merely defines some minimum RC diffusion time constant.

It appears, then, that the transverse currents merely add another requirement on the magnitude of the capacitance required to sustain the propagation. Initially, it was only required that the capacitance provide a sufficient amount of energy to the discharge to insure triggering the neighboring stage. Now it is additionally required that it be large enough to provide a sufficiently slow wave electric transmission channel.

Figure 7:
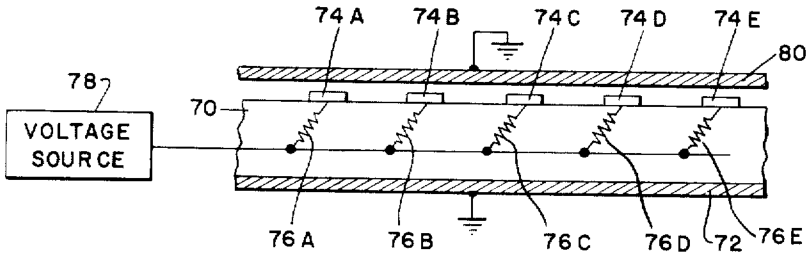
FIGURE 7 is a schematic drawing of an embodiment of the invention having a distributed structure.

FIGURE 7 is a schematic drawing illustrating an embodiment of the invention having distributive structure. Since all the capacitors shown in FIGURE 5 have one plate electrically in common, the transition from the structure of FIGURE 5 to that of FIGURE 7 should be clear. The block of thermistor material 70 has a metal electrode 72 deposited on one side and connected to ground and a plurality of separate spaced electrodes 74A through 74F deposited on the other side of the thermistor material. The separate electrodes are all connected through separate resistors 76A through 76E to a voltage source 78. A single capacitor electrode 80 is capacitively spaced from the electrodes 74A through 74E and is in turn connected to ground.

Figure 8:
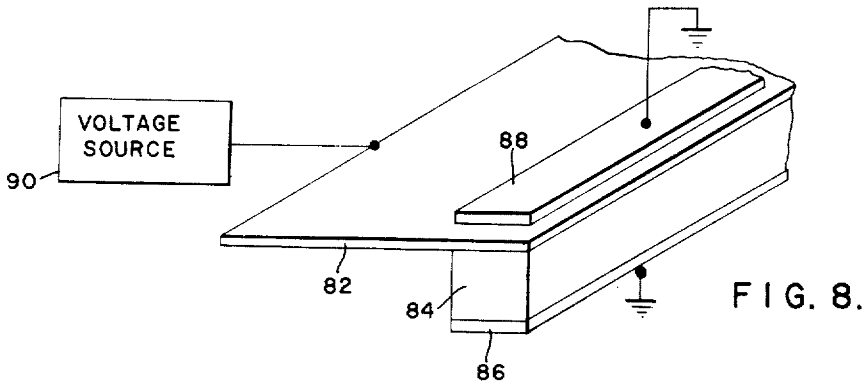
FIGURE 8 is an isometric drawing of an embodiment of the invention having a distributed structure.

FIGURE 8 illustrates an embodiment of the invention having a totally distributed structure and wherein the separate electrodes 74A through 74E are effectively replaced by a single electrode 82. This electrode is positioned on one side of the thermistor material 84, on the other side of which is the contact electrode 86, which is connected to ground. Capacitively spaced above the electrode 82 is the other capacitive electrode 88, which also is connected to ground. If all the electrodes 74A through 74E were merely connected together to form a continuous strip, all capacitors would be effectively short-circuited, and the device would be inoperative. However, by using a sufficiently thin conductive film represented by the electrode 82 for the continuous electrode, adequate decoupling can be obtained. Consider, for example, the resistance between points on opposite sides of this film and between points along the same side of the film. As the film is made thinner, the resistance between points on opposite sides of the film decreases and that between points on the same side of the film increases. Hence, the film need only be made sufficiently thin that the series resistance per unit length along the line, together with the capacitance per unit length along the line, provides the correct diffusion constant for the S component of the wave. At the same time, the thinner the film is made, the better the contact between each unit of active element and its associated capacitance.

The thin-film electrode is extended beyond the edges of the thermistor material structure to form a relatively high resistance connection circuit to the source voltage 90. To complete the homogeneity of the distributed arrangement, it is preferable to replace the lumped source voltage 90 by a truly distributed energy source, such as a strip of thermoelectric generator or a strip of electrochemical convertor in parallel with the neuristor line. In this way, a device or network of such devices may be truly thought of as being immersed in an energy environment.

Figures 9, 11:
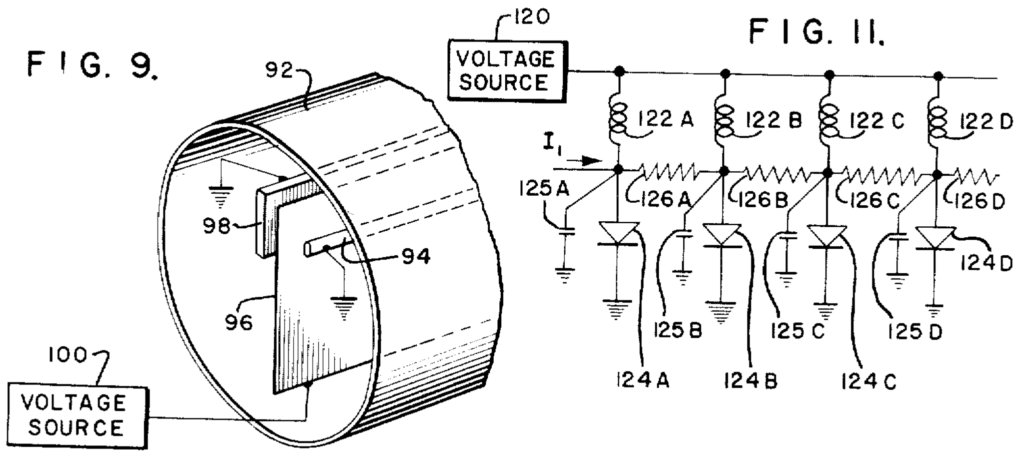
FIGURE 9 is an isometric drawing of another embodiment of the invention having a distributed structure.
FIGURE 11 is a circuit diagram of still another embodiment of the invention using lumped elements.

It should be noted that the distributed structures of the types exemplified by FIGURES 7 and 8 and FIGURE 9, to be described, may also be construed as made up of a plurality of lumped elements, each extending a small, finite distance along the line and each having the requisite properties.

FIGURE 9 is an isometric drawing of another embodiment of the invention having a distributed structure. The voltage current characteristic of a gas discharge is similar to that of a thermistor, being a single-valued function of I with a negative resistance range. In FIGURE 9, within an envelope 92 there is enclosed a gas, within which are positioned a discharge electrode 94 which is connected to ground and which is spaced from a thin conductive film 96. On the other side of the film and positioned opposite the discharge electrode is a capacitor electrode 98, said capacitor electrode being capacitively spaced from the conductive thin film. This capacitor electrode is also grounded. The thin film 96 is connected to a suitable voltage source 100. The thin-film electrode 96 serves two functions. On one side it performs the role of a discharge electrode, and on the opposite side it forms one plate of the distributed capacitance. Thus, for the same reasons previously discussed, this thin-film electrode 96 must be sufficiently thin so as not to short-circuit the S component of the wave. A gas discharge, once initiated at any point along the discharge electrode 94, will result in two small glow regions propagating away from that point (one in each direction) with constant velocity and without attenuation. It should be noted that the T variable for this structure may be primarily measured at each point in terms of the free charge carrier density in the gas. A discharge may be initiated by connecting the conductive thin film to a voltage source which will raise the voltage of the point of connection sufficiently high to cause the discharge to form between that point and the discharge electrode 94. The gas between the discharge electrode 94 and the conductive film 96 can be considered as replacing the thermistor material 84 in FIGURE 8.

Figure 10:
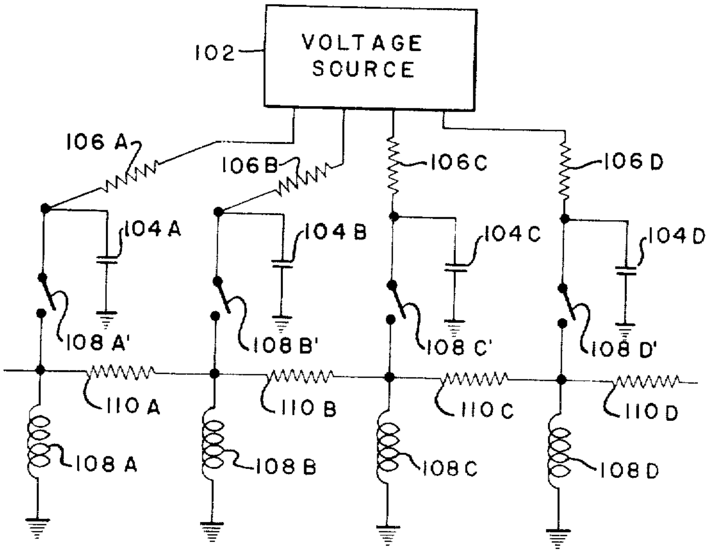
FIGURE 10 is a circuit diagram of another embodiment of the invention using lumped elements.

FIGURE 10 is a circuit diagram of another embodiment of the invention, using resistors, capacitors, and relays. A voltage source 102 supplies the required current for charging capacitors 104A, 104B, 104C, 104D through a plurality of high-resistance-value resistors 106A through 106D. Relay coils 108A through 108D are respectively connected in parallel with capacitors 104A through 104D through normally open associated relay contacts 108A' through 108D'. A resistor 110A connects to one end of the relay coil 108A to one end of the relay coil 108B; resistor 110B connects one end of relay coil 108B to one end of relay coil 108C; resistor 110C connects one end of relay coil 108C to one end of relay coil 108D; etc.

Assume, now, that a triggering voltage is applied across relay coil 108A, which is sufficient to enable it to close its contacts 108A'. Or, the same effect may be achieved by applying a force to the relay contacts 108A', sufficient to momentarily close these contacts. Capacitor 104A, which has been charged up with a sufficiently high voltage from voltage source 102, commences to discharge and provides a sufficiently high current to not only enable relay coil 108A to remain operated, but also sufficient to flow through resistor 110A and to cause relay coil 108B to become operative. As a result, contacts 108B' are closed. Capacitor 104B commences to discharge through relay coil 108B and also to energize relay coil 108C to close its associated contacts 108C'.

In the manner described, the initial triggering potential propagates down the line, causing the relays to operate in sequence and the capacitors to accordingly be discharged. The time required for the capacitors to become charged up, as well as for the relays to be rendered operative again, in view of their having been operated, comprises their refractory period. Thus, a refractory period exists for each one of the neuristor elements in the line. The size of the resistors 106A through 106D is selected to be such that the current from the voltage source alone is insufficient to maintain any one of the relays 108A through 108D operated. Because of the attenuation introduced by the resistors 110A, 110B, etc., when, for example, relay 108D is rendered operative, by which time relay 108A may have become inoperative, the amount of current from capacitor 104D being discharged, which reaches relay 108A, is insufficient to cause it to become operative. Any one of the capacitors 104A through 104D stores sufficient energy to be enabled to operate, not only the relay with which it is associated, but also the relays on either side of that one. Accordingly, should a triggering energy be applied to relay coil 108C, assuming the line has become quiescent again, then its contact 108C' is closed and capacitor 104C will be discharged. The current supplied by capacitor 104C will be sufficient to operate relay coils 108B and 108D. These, in turn, will close their associated contacts and cause the capacitors associated therewith to discharge. In this manner, propagation will occur in two opposite directions from the central relay which was triggered.

Figure 10A:
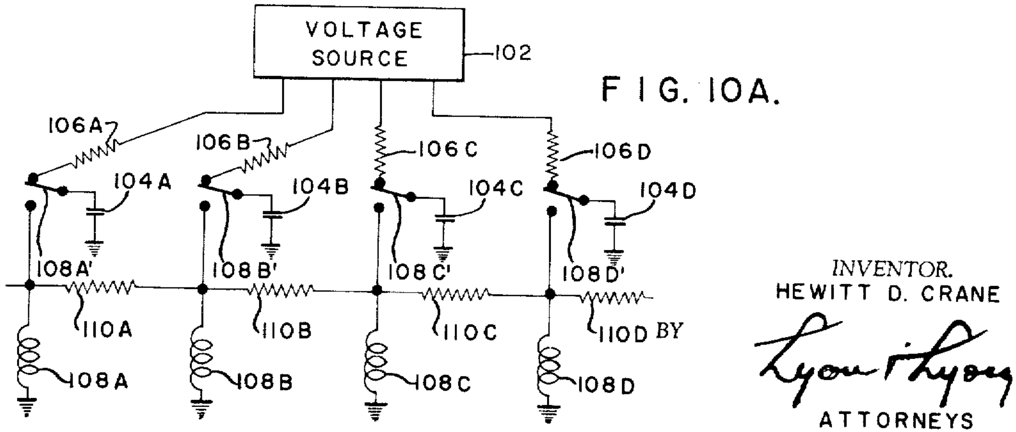
FIGURE 10A is another preferred circuit arrangement similar to FIGURE 10.

A preferred arrangement of a line in accordance with this invention involves a slight modification of FIGURE 10 and is shown in FIGURE 10A. The same reference numerals are employed for identical structure as are employed in FIGURE 10. The only difference between FIGURES 10 and 10A is that the single-pole double-throw contacts 108A' through 108D' in the inoperative relay position connect the respective capacitors 104A through 104D to the respective resistors 106A through 106D. In the relay operated position, the respective capacitors are connected by the single-pole double-throw contacts 108A' through 108D' into the respective relay coils 109A through 109D in the manner described for FIGURE 10A. Operation of this line is the same as described for FIGURE 10.

FIGURE 11 is a circuit diagram of another embodiment of the invention which employs two terminal active elements. Each one of these elements includes an inductance, respectively 122A through 122D, which is connected in series with an active device whose steady-state characteristics resemble those of a tunnel diode, respectively 124A through 124D. A different capacitor 125A through 125D, respectively is connected across a different one of the tunnel diodes 124A through 124D. A common voltage source 120 is employed to apply current to all the series-connected inductors and tunnel diodes, respectively, 122A, 124A through 122D, 124D. The junction between an inductance and a tunnel diode is connected to the junction between a succeeding inductance and tunnel diode by a different one of the respective resistors 126A through 126C.

FIGURE 12 is a characteristic curve for a tunnel diode. Assume that the voltage source 120 provides a current $I_0$ for all the tunnel diodes 124A through 124D, which places them at point A on the characteristic curve. Assume, now, that a triggering current of value $I_1$ is applied to tunnel diode 124A.

From the characteristic curve shown in FIGURE 12, it will be noted that the current through the tunnel diode 126A, in response to this current, first will increase. It will then drop off rather rapidly as the diode enters its active region, and then begins to increase again. This causes the voltage across the tunnel diode to increase in a direction to cause current flow through resistor 126A and thereby to trigger the succeeding tunnel diode 126B. In this manner, a pulse can be propagated successively down the line. Note that the circuit is energized from a voltage source $V_0$, and, therefore, the only stable steady-state point is at point A. After the operating point of a diode has been forced to move away from point A, the increasing voltage across the diode causes a decrease of current through the associated inductor, just as an increasing current in the thermistor of FIGURE 1, as shown by its characteristics in FIGURE 3, caused a decreasing voltage across the capacitor. In the present case, when the current gets sufficiently low, the operating point of the tunnel diode shifts in a manner indicated by curve

130 to the initial positive region, and hence to the operating point A.

Thus, the application of the triggering force causes a propagation of a pulse to proceed down the line. It can be shown that if the triggering force is applied to any portion of the line other than the two ends, the propagation will spread outward from the triggering point in both directions. The inductances play the same energy-storage role as the capacitances in FIGURE 1; thus, there is a refractory period following passage of a wave which prevents response of any one of the tunnel diodes to a triggering force which is applied before that refractory period is terminated.

There has thus far been described some embodiments of the invention which may be considered as lumped elements interconnected in a line, such as illustrated in FIGURES 1, 10, and 11, and other embodiments of the invention, which have a distributed structure. When the term "element" is used hereafter and in the claims, it is intended to mean either that structure of a lumped line or so much of the structure of the distributed line as exhibits the properties of threshold stimulability, attenuationless propagation, characteristic velocity propagation, and a refractory period following the passage of a discharge.

Thus far there has been described structures which may be used to form lines which have the four properties specified. In the description that follows, it will be shown how these lines may be interconnected for the purpose of accomplishing a number of useful functions.

In connection with the description of the embodiment of the invention shown in FIGURE 1, it was pointed out that each stage had the ability to trigger one neighboring stage, in order to insure propagation. It is reasonable to assume, however, that one stage can successfully trigger more than a single neighbor, assuming the generation of sufficient trigger strength in the propagating discharge. This would be somewhat analogous to connecting several fuses together. Thus, when a chemical burning wave reaches the junction, similar discharge waves are initiated in all such connected fuses.

Reference is now made to FIGURE 13 of the drawings which illustrates how one line in accordance with this invention may be connected to two or more other lines in a manner so that a pulse, traveling down that one line, can trigger the other lines. The type of trigger coupling illustrated in FIGURE 13 is defined as a "T-junction" and will hereafter be referred to in this manner. In FIGURE 13, a plurality of lines 130, 132, 134, 136, and 138 of the type described in connection with FIGURE 1 are interconnected together in a manner so that a pulse arriving at the junction 140 from any one line will trigger a pulse on each of the other lines. It will be recalled in connection with the description in FIGURE 1 that the arrows coupling the rectangles represent the trigger coupling between the elements of the line. If N is considered as the number of lines coming together at a junction, then for $N=3$ a fanout of two is obtained. The term "fanout" is used in its popular computer sense, implying that a signal can make itself felt in a number of different places, the maximum number of places being equal to the fanout number. In the present case, a single pulse on an input line can generate two separate pulses which can propagate independently down two separate lines. An $N=3$ junction is the minimum size T-junction of interest as far as fanout is concerned. It should be clear, however, that an arbitrary degree of fanout can be achieved by cascading $N=3$ junctions.

FIGURE 14 exemplifies the circuit diagram for a T-junction with an embodiment of the invention which was shown and described in connection with FIGURE 10. The dotted rectangles 142, 144, and 146 each encloses a separate line, so that FIGURE 14 represents three lines which are connected together in a T-junction. For making such connection with lines of the type shown in FIGURE 14, three resistors 150, 152 and 154 are employed. Resistor 150 connects the junction of the relay coil 156 with its switch contacts 158 to the junction of the relay coil 160 with its switch contact. Resistor 152 connects the junction of the relay coil 156 to its switch contact 158 to the junction of the relay coil 164 with its switch contacts 166. Resistor 154 connects the junction of relay coil 160 and its contacts 162 with the junction of relay coil 164 and its contact 166.

When relay 156 is energized, as a result of a triggering pulse which has been propagated down the line 142, it closes its contact 158, whereupon the capacitor 159 is enabled to discharge. The discharging capacitor, together with energy from the voltage source, is sufficient to energize the relay coil 164 through the resistor 152 and the relay coil 160 through the resistor 150. As a result, the lines 144 and 146 then commence to propagate a pulse along each one of these lines. Similarly, should relay 160 become energized as a result of the propagation of a pulse along line 144, then relays 156 and 164 will become subsequently energized to propagate a pulse along lines 142 and 146. Finally, should relay 164 become energized as a result of the pulse which has been propagated along line 146, then through resistors 152 and 154, lines 142 and 144 will be triggered and will commence to propagate pulses therealong.

FIGURE 15 is a schematic drawing illustrating T-junctions. The lines 130, 132, 138, 136, and 134 represent lines in accordance with this invention as shown in FIGURE 13. The junction 140 is represented in FIGURE 15 by a heavy dot. Also shown is a representation of an $N=3$ T-junction of the type shown in FIGURE 14. The lines are given the same reference numerals as in FIGURE 14. In addition, it is shown how an arbitrary degree of fanout can be achieved by cascading $N=3$ junctions. In this case, a pulse on one line excites two lines; these, in turn, excite four lines; etc. The cascaded junctions cannot be placed arbitrarily close, however, since due to the increased trigger load at the junction point, the triggered waves on the output lines are undoubtedly somewhat weaker than the initial entering wave, and a finite distance of line is required for pulse buildup before having an output pulse, in turn, trigger two other lines.

Figure 16:
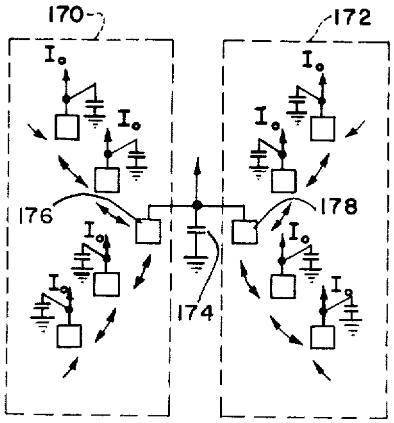
FIGURE 16 is a drawing illustrating how two lines in accordance with this invention are interconnected to share a single common energy source or to have a common refractory period.

Another arrangement for connecting two lines together for achieving an unusual result is shown in FIGURE 16. This type of junction will be hereafter known as an "S-junction." In FIGURE 16, there are shown two lines enclosed in the respective dotted rectangles 170, 172, which are of the type shown and described in FIGURE 1. This is by way of exemplification of all the other lines shown previously. It will be noted that two stages of these lines share a common capacitor 174, or have access to a single source of energy. Assume, now, that a pulse is propagated along the line 170 from either direction. When this pulse triggers the element 176 with which the capacitor 174 is associated, the capacitor 174 discharges. As a result, the element 178 in line 172 which is also connected to the capacitor 174, in common with the element 176, will have a refractory period as determined by the time required for the capacitor 174 to charge up. Thus, effectively, a pulse traveling down either line 170 or 172 causes the other line to have a refractory period of the element sharing a common coupling capacitor, during which period a pulse cannot be transmitted through that element. It should be emphasized also that the triggering of one element 176 will not result in the triggering of the element 178, and vice versa.

Figure 17:
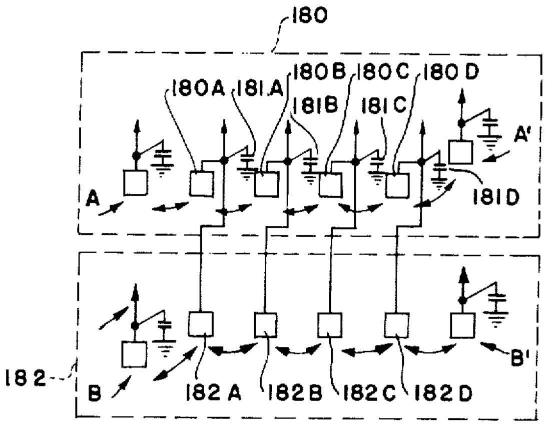
FIGURE 17 is a drawing illustrating how two lines in accordance with this invention are interconnected in an S junction to share a plurality of common energy sources.

In system design, an S-junction of extended length is of particular interest. By this is meant that two lines share more than a single common energy storage, or a portion of two lines have a common refractory period. The properties of the extended junction are essentially identical to those of a single junction, except that a pulse on one line inhibits the other line for a longer period of time. FIGURE 17 exemplifies an S-junction wherein more than one element of both lines share a common capacitor. Two lines 180, 182 are enclosed in two dotted rectangles. These lines are of the same type as was described in connection with FIGURE 1. This, however, is intended to be illustrative only, since any of the other embodiments of the invention may be interconnected in the manner to be described. It will be seen that elements 180A, 180B, 180C, and 180D of line 180 share the respective common capacitors 181A, 181B, 181C, 181D with the elements 182A, 182B, 182C, and 182D of line 182. A pulse propagating along line 180 in one direction will inhibit any pulses from being propagated along line 182 in the opposite direction for the length of time required for the capacitors 181A through 181D to become successively charged back up again.

Figures 18, 19:
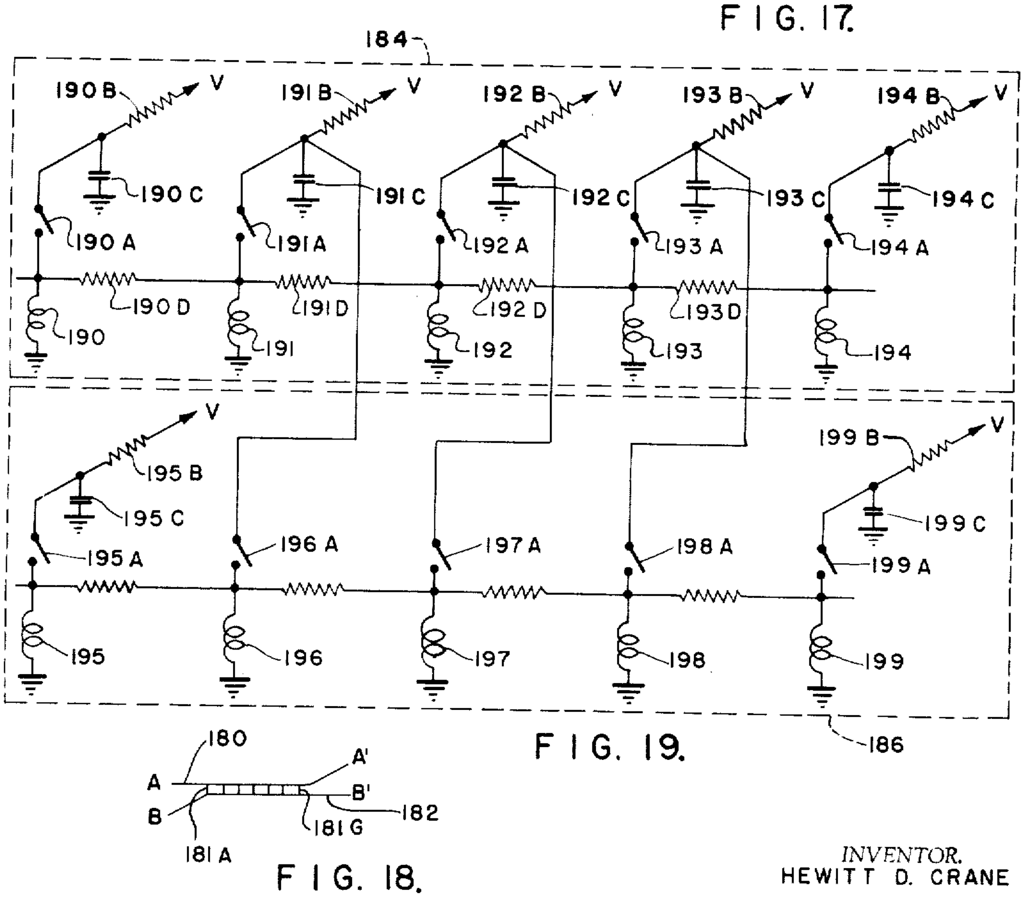
FIGURE 18 is a schematic drawing illustrating the type of interconnection shown in FIGURE 17.
FIGURE 19 is a circuit diagram illustrating how lumped lines of the type shown in FIGURE 10 may be connected to form an S junction.

FIGURE 18 is a schematic representation of the type of S-coupling shown in FIGURE 17. The lines 180 and 182 are represented by the straight lines parallel to each other over the S-coupling region, with the intersecting lines 181A through 181G indicating the fact that the coupling is extended, or that a plurality of common energy-storage elements are being shared along the line lengths.

Of interest in connection with the S-junction is an appreciation of what happens when two pulses are propagated along the lines 180, 182 from opposite directions, which pulses will collide within the S-junction region. Since both lines share common energy-storage elements, effectively, a pulse on either line is the same as a pulse on the other line, as far as the energy-storage elements are concerned. Therefore, as in the case of a single line on which two pulses are traveling toward one another and upon collision die out because of the refractive property, so in an S-junction, upon collision, two pulses or signals die out because of the refractive property. If the two pulses do not collide within the region of the junction, the first pulse to arrive surely passes the junction, but, since the passage of the first pulse leaves a refractory period that takes time to disappear, the second pulse may or may not pass, depending upon the exact timing relation.

Assume that two pulses approach the junction on separate lines, but on a parallel instead of a collision course. With adequate spacing in time, each pulse passes the S-junction unaffected by the other, since by the time of arrival of the second pulse the effects of the passage of the first pulse have disappeared. As the period of separation decreases, a point is reached for which the second pulse does not pass the structure, since it arrives at a time when the structure is still refractory from the passage of the first pulse. With zero spacing between pulses, the result is nondeterministic.

Should a pair of pulses traveling on a parallel course reach the S-junction at precisely the same instant, the two elements sharing the same energy storage try to propagate pulses simultaneously. This may not represent any special problem, since it merely implies that only half the stored energy is available to each line. In this regard it has already been indicated that to insure stable propagation of the pulse, many times more storage energy should be provided than the minimum actually required. However, should both waves start traveling in perfect synchronism, and, due to some perturbation, one of the waves tends to surge ahead of the other, then, if the S-junction is of sufficient length, this wave will progressively increase its lead until the lagging pulse disappears entirely. To reason this way, it must be understood that the velocity of wave or pulse propagation depends to some degree on the level of energy storage available to the line. Since the pulse that is leading or beginning to move away from the lagging pulse takes more and more of the available common energy, its velocity will increase still more relative to the lagging wave. This increase in velocity continues until the lagging wave or pulse disappears entirely. The simultaneous propagation of two waves or pulses in this manner is therefore inherently unstable. For a sufficiently long junction, there is essentially zero probability that both pulses will pass, although one pulse or the other is certain to get through.

FIGURE 19 is a circuit diagram showing how the embodiment of the invention of the type illustrated in FIGURE 10 may be connected into an S-junction. The two separate lines are respectively designated by reference numerals 184, 186, which are applied to the dotted rectangles enclosing these lines. The line 184 includes, as previously described, a plurality of relays 190, 191, 192, 193, and 194. Associated with each relay coil are the respective relay contacts 190A, 191A, 192A, 193A, and 194A. One of these relay contacts is connected to one end of the associated relay coil; the other of the relay contacts is respectively connected to a separate resistor 190B, 191B, 192B, 193B, and 194B. Respective capacitors 190C, 191C, 192C, 193C, and 194C are connected between one end of said resistors and ground. The relay coils 190, 191, 192, 193, and 194 have one of their ends grounded, and resistors 190D, 191D, 192D, and 193D are connected between their other ends.

The second line 186 also consists of a plurality of relays having relay coils 195, 196, 197, 198, and 199. The associated contacts 195A through 199A have one of these contacts connected to one end of the relay coils. The other end of each relay coil is connected to ground. The other ones of the contacts 195A and 199A are each connected to a separate resistor, respectively 195B, 199B, as in the normal situation: that is, where no S-coupling is provided for. There is also provided for these elements a capacitor, respectively 195C, 199C. However, the other ones of each of the contacts 196A, 197A, and 198A are respectively connected to each of the junctions between the respective capacitors 191C, 192C, 193C and resistors 191B, 192B, 193B. In this manner the sections of the lines 191 through 193 and 196 through 198, respectively, share common capacitors and/or energy-storage elements, respectively 191C, 192C, and 193C. The operation of this line is as described in connection with the description of FIGURE 18. It is very simple to interconnect two lines to have an S-junction merely by connecting the capacitors in parallel in the portions of two lines wherein common energy sharing is desired. It will be appreciated that the symbols shown in FIGURE 18 also represents the S-junction shown in FIGURE 19.

Figure 20A:
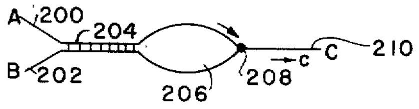
FIGURES 20A and 20B are schematic drawings illustrating a T–S junction.
Figure 20B:
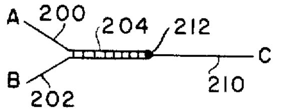

FIGURES 20A and 20B show two forms of T–S junctions. These are represented by two lines 200, 202, which are brought together in an S-junction at the region 204. In FIGURE 20A the two lines then separate in the region 206 and are brought together at a T-junction in the region 208 along with the third line 210. In FIGURE 20B the two lines 200, 202 immediately at the termination of the S-junction 204 are brought together at a T-junction with the third line 210.

A pulse on either line 200 or 202 in FIGURE 20A will pass the S-junction region 204 and then proceed along one or the other of the lines, depending upon which one was initially excited, to the T-junction region 208. Here this pulse initiates two pulses or wavefronts, one of which will continue along the line 210 and the other of which will return toward the S-junction region on the one of the lines 200, 202 which was not originally excited. Although the initial exciting pulse applied to the line 200, for example, returns to the S-junction region 204 along the line 202, whether or not this pulse will pass through the S-junction region depends upon the spacing between the end of the S-junction and the T-junction. If such spacing is too close, the S-junction region is still in its refractory period and the pulse will die. If sufficient spacing is permitted, then the pulse will travel through the S-junction. In the situation shown in FIGURE 20B, a pulse on either line 200 or 202 will be transmitted to line 210, but not to the other unexcited line.

The T-S junction shown in FIGURE 20A or 20B has the interesting property that "an input" pulse on either line 200 or 202 results in an output pulse on line 210. Thus, the arrangement can be considered analogous in operation to the type of logic gate known as an "OR" gate. T-S junctions of the type shown in FIGURE 20B may be cascaded simply in a manner so that a single input on any one of a plurality of input lines results in a single output. Plural inputs result in no output.

Figure 21:
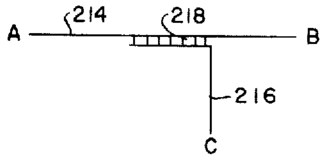
FIGURE 21 is a schematic diagram of an S junction used to provide a gate structure.

An S-junction may be employed as a gate structure to control propagation along another line. Attention is directed to FIGURE 21 wherein there is shown a line 214, having another line 216 make an S-junction at the region 218 with the line 214. The line 216 terminates immediately after the S-junction region 218. A pulse on the line 216 can effectively control whether or not a pulse will get through the line 214, since such pulse establishes a refractory period within the S-junction region 218. When the pulse reaches the end of line 216, it simply disappears.

It must be noted that a pulse, once started on a transmission line made in accordance with this invention, can be terminated in only two ways. One of these is by reaching an open end of the line; the other is by colliding with another pulse on the line. Advantage can be taken of S- and T-junctions in connection with these two properties to build a vast number of different networks for achieving desired results. In this connection, some further properties of the T- and S-junctions should now be noted. If two pulses are started on two lines of a T-junction, a single output pulse will be obtained on the third line, and the two input pulses will annihilate each other on one or the other input lines, depending upon which pulse was started later. This can be seen from the fact that the first of two input pulses to arrive at the T-junction initiates two pulses down the remaining two lines. Thus, on one of these remaining two lines there are two pulses traveling toward one another resulting in self-annihilation. If two pulses reach the junction simultaneously, a single output pulse on the third line is surely generated, but the two pulses arriving at the junction simultaneously directly annihilate each other.

The situation where two pulses travel on two lines in the same direction toward a common S-junction has been previously considered. The situation wherein two pulses on two lines traveling from opposite directions toward each other and toward an S-junction has also been previously considered. As shown previously, if these pulses collide in the junction, they annihiliate each other. If they are sufficiently delayed so that there is no collision, then the pulses travel through the S-junction without interference. Hence, there is a range of timing for which a pulse from terminal A will not reach terminal B.

The performance of a T-S junction in response to two pulses has already been considered. The next structure to be considered is that of a unilateral structure, shown in FIGURE 22, which is made from the combination of a T-junction and an S-junction. By way of example, three lines 220, 222, and 224 are employed. Lines 220, 222, and 224 are combined to form a T-junction 226. Lines 224 and 222 are combined to form an S-junction 228. Line 224 terminates after making the S-junction. The lengths of lines 222 and 224 are made substantially equal or such that pulses on lines 222 and 224 from T-junction 226 will reach opposite ends of the S-junction simultaneously. Therefore, any pulse applied to the line 220 cannot pass the S-junction. However, assume a pulse applied to the line 222 at terminal B will travel through the S-junction to the T-junction. At the T-junction, it will excite lines 220 and 224. The pulse on line 224 will flow back through the S-junction, and, since the line 224 terminates there, this pulse is annihilated. However, the pulse which is initiated on line 220 will travel out to terminal A. Therefore, it can be concluded that the structure shown in FIGURE 22 conducts pulses unilaterally from terminal B to terminal A.

Figure 22:
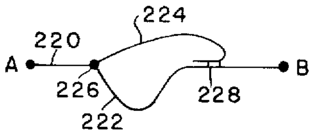
FIGURE 22 is a schematic diagram of a unilaterally conducting structure made from a T and S junction.
Figures 23A, 23B, 24A:
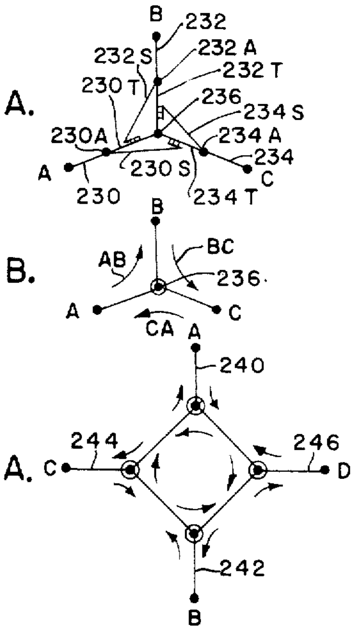
FIGURE 23A is a schematic diagram of a single controlled crossing using structure in accordance with this invention.
FIGURE 23B is a symbolic representation of the schematic drawing shown in FIGURE 23A.
FIGURE 24A is a symbolic drawing of two crossing paths in accordance with this invention, wherein signals may flow in either path without interfering with the other.

Structures having the properties described for the T- and S-junction interconnections shown in FIGURE 22 may be interconnected to provide junctions or crossings wherein the directions of pulse travel may be controlled. Referring now to FIGURE 23A, the structure of which is symbolically represented by FIGURE 23B, there may be seen three lines, 230, 232, 234, respectively connected between terminals A, B, and C and T-junctions 230A, 232A, and 234A. From T-junction 230A, a first line 230T extends to a T-junction 236. A second line 230S extends to an S-junction, which is made with the line 234T. The line 234T also extends to the T-junction 236. From the T-junction 232A a line 232T extends to the T-junction 236, and a line 234S makes an S-junction with the line 232T.

Line 232S extends from T-junction 232A to an S-junction with line 230T. Line 234S extends to an S-junction with line 232T from T-junction 234A. Inspection of FIGURE 23A will reveal that it essentially comprises three of the structures shown in FIGURE 22. Considering FIGURE 23A again, an input pulse at terminal A will proceed along line 230 through T-junction 230A, line 230T through T-junction 236, along line 232T through T-junction 232A, along line 232 and out at terminal B. A pulse traveling from the T-junction 230A along line 230S ends when the line 230S ends in the S-junction. Similarly, at the T-junction 232A, a pulse initiated along the line 232S dies, since it comes to the end of the line 232S at the S-junction. In view of the fact that the S-junction at the end of the line 230S renders the portion of the line 234T refractory, the pulse which arises at the T-junction 236 in response to the pulse supplied to terminal A, travels along line 234T toward T-junction 234A, and never reaches that T-junction, but dies within the S-junction. As a result, it can be concluded that a pulse which is initiated at terminal A of line 230 will reach terminal B of line 232, but will not reach terminal C of line 234.

By following the operation of the interconnections in the manner described in connection with terminal A, it can be established that a pulse supplied to terminal B of line 232 will only travel to terminal C of line 234. Similarly, a pulse supplied to terminal C of line 234 will only travel to terminal A of line 230. A symbolic representation of the interconnections of FIGURE 23A is shown in FIGURE 23B, where terminals A, B, and C are joined by three lines to a junction 236, and the arrows AB, BC, and CA, respectively, designate the unilateral direction of pulse flow.

Figure 24B:
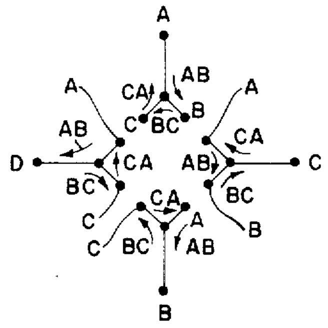
FIGURE 24B shows how

FIGURE 24A is a symbolic drawing of two crossing paths in accordance with this invention, wherein signals may flow in either path, without interfering with the other. The structure shown in FIGURE 24 has four input terminals, A, B, C, and D, respectively serving as input for lines 240, 242, 244, and 246. Upon close inspection it will be seen that FIGURE 24 actually comprises four of the structures shown in FIGURE 23A and symbolically represented in FIGURE 23B, which are interconnected to provide a noninteracting crossing structure. In order to illustrate this more graphically, attention is directed to FIGURE 24B. This shows the four FIGURES 23B positioned so that the structure in operation of FIGURE 24A may be readily understood. The four FIGURES 23B shown in FIGURE 24B are identified by the same letters as were shown in FIGURE 23B. Thus, the arrow designated as AB represents the fact that pulse travel occurs between terminals A and B. The arrow represented as BC represents the fact that pulse travel occurs only between terminals B and C, and the arrow CA represents the fact that pulse travel occurs only between terminals C and A.

Consider, now, the effect of a pulse supplied to terminal A at the uppermost of the four structures shown in FIGURE 24B. The pulse will travel from terminal A to terminal B of the uppermost structure. Then, if terminal B of the uppermost structure is connected to terminal A of the structure to the right thereof, it will be seen that the pulse will travel to terminal B of this second network. If terminal B of the second network is connected to terminal A of the lower network, then the pulse will travel from terminal A of the lower network to terminal B of the lower network. If a pulse is applied to terminal B of the lower network, it will go to terminal C of the lower network. If terminal C of the lower network is connected to terminal C of the network to the left thereof, this pulse will next travel to terminal A. If terminal A of this network is connected to terminal C of the upper network, the pulse will appear at terminal A of the upper network. It is thus seen that pulses can travel between the terminal A of the upper network and terminal B of the lower network (designated as terminal A of line 240 and terminal B of line 242 in FIGURE 24A), without appearing at either of the other two output terminals. It can be similarly shown that by employing FIGURE 24B a pulse applied to terminal C of FIGURE 24A will appear at terminal D, and a pulse applied to terminal D of FIGURE 24A will appear at terminal C without appearing at either of the other two output terminals of the structure.

It should be appreciated that when four separate lines are brought together they can form $4\times3=12$ possible paths. Hence, we can expect to find $2^{12}$, 4096 such four-line structures. The arrangement shown in FIGURE 24A is only one of those possibilities. By using controlled crossings in structures, any digital computer can be realized on a two-dimensional structure in this sense. For any system it can be shown that a realization exists for which it can be guaranteed that all controlled crossings are used in a safe manner with regard to pulse timing.

Figure 25:
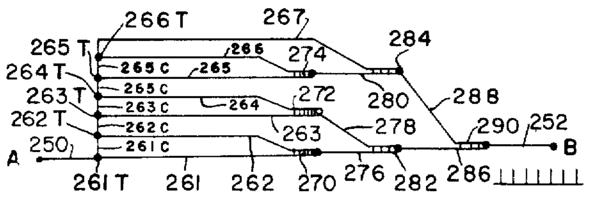
FIGURE 25 shows a schematic drawing of a pulse train generator in accordance with this invention.

Heretofore, it has been shown that pulses can be brought together to collide in a special manner. FIGURE 25 illustrates how a single pulse may be used to generate N pulses, which are made to interact in a non-collision mode, in order to form a pulse train N pulses long. With this structure there is provided an input terminal A, to which pulses are applied, and an output terminal B, from which a pulse train is derived. An input line 250 is connected to the input terminal A′; an output line 252 is connected to the output terminal B. The structure between the input and output line consists of an arrangement for exciting with T-junctions as many lines as there are pulses desired. By giving different lengths to these lines, the spacing between the pulses which have been generated is achieved. The pulses from all the lines are then combined by means of T–S junctions back to the single output line 252.

By way of example, FIGURE 25 shows seven pulses being generated in response to an input pulse. The seven lines employed in generating the seven pulses are respectively given reference numerals 261 through 267. T-junctions 261T through 266T are employed for exciting these lines from a single input line 250. A separate coupling line 261C through 265C couples the output from a preceding T-junction to a succeeding T-junction, to which one end of the line and a coupling line are in pulse-propagating relationship. The lines 261 through 267 are divided into pairs, and each pair of lines is brought out to a T–S junction 270, 272, 274. It should be noted that one line of a pair, i.e., 262, is longer than the other line of a pair, i.e., 261, so that the pulses being propagated down these lines will arrive at the T–S junction sufficiently spaced from one another to avoid annihilation of one of the pulses by the refractory time caused by the other in the S-junction. Succeeding lines 276, 278, 280 are again paired (together with any odd line, such as 267) and terminated in T–S junctions 282, 284. The outputs of these T–S junctions drive further lines 286, 288, which, in turn, are paired and brought to a T–S junction 290. This structure is repeated a sufficient number of times to insure that all the pulses on all the lines 261 through 267 are applied to the single output line 252. Thus, a pulse-train generator may be built wherein any desired spacing between pulses may be achieved, which generates the pulse-train output in response to a single input pulse.

If a line which has a length greater than one refractory length is connected end to end, so as to form a closed ring structure, then a pulse, once started in the ring, will propagate indefinitely. (If the closed ring structure is significantly longer than one refractory length, more than a single pule can propagate.) In this way, a storage ring can be used to store a pattern of pulses. If the variable has the value "one," this is represented by a propagating pulse in the storage ring. If the variable has the value "zero," this is represented by the lack of a circulating pulse. In the course of logical computation, variables change value, so it is necessary to investigate the methods of controlling the state of pulse circulation in a ring structure. The three necessary functions are pulse entry, pulse detection (readout), and pulse clearing.

Figure 26:
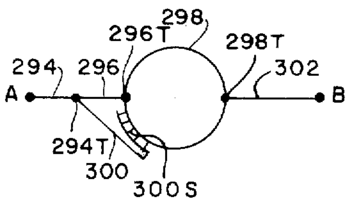
FIGURE 26 shows a ring structure with pulse readin and readout, in accordance with this invention.

Reference is now made to FIGURE 26 where is shown, schematically and in accordance with this invention, a ring structure with pulse readin and readout structures. The method of reading into a ring structure by connecting an input line to a T-junction in the ring structure is not desirable, since thereby two pulses will be initiated in the ring structure which will circulate in opposite directions, will collide, and thus will annihilate each other. The arrangement for reading shown in FIGURE 26 includes an input line 294 which is connected to a T-junction 294T. One of the output lines 296 from the T-junction 294T is connected into the ring structure 298 by means of the T-junction 296T. The other line 300, which is coupled to the T-junction 294T, is coupled to the ring structure 298 by means of an S-junction 300S. Output from the ring structure 298 is derived by means of a T-junction 298T, from which there extends a line 302.

A pulse supplied to the input terminal A proceeds down line 294 to the T-junction 294T, which excites lines 296 and 300. The pulse on line 296 enters the ring structure 298 by means of the T-junction 296T. The pulse traveling counterclockwise in the ring will be annihilated by reason of the fact that the pulse on line 300 enteıs the S-junction 300 at the end opposite to the end at which the counterclockwise circulating pulse enters the S-junction region. Thus, a collision with annihilation will occur. The pulse which proceeds in a clockwise direction from junction 296T can continue to circulate. When the circulating pulse passes through T-junction 298T, an output pulse is propagated down line 302 to output terminal B. This circulating pulse, upon reaching the T-junction 296T, can propagate a pulse along line 296. As a result, a pulse will also be seen on input terminal A. The pulse which proceeds down line 300 again, as a result of this one, will not interfere with the pulse circulating in the ring structure 298, since the S-junction 300S will clear before the circulating pulse will reach the S-junction again. It should be understood that with the arrangement shown in FIGURE 26 a pulse circulates through the ring structure 298 in a clockwise direction. By shifting the line 300 and S-junction 300S to the other side of the line 296 or of the junction 296T, a counterclockwise pulse can be made to circulate in the ring structure.

Figure 27:
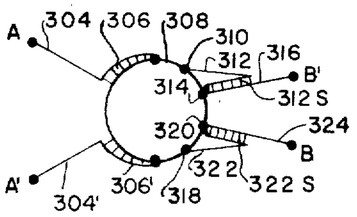
FIGURE 27 shows another ring structure arrangement with pulse readin and readout.

It may be desirable to excite a ring structure without having a pulse transmitted back to the input each time the circulating pulse passes the input T-junction. This is shown in FIGURE 27, which also has an arrangement for accomplishing a circulation of a pulse in a desired direction, as well as structure for reading out only when a pulse is circulating in a desired direction. From an input terminal A, a line 304 extends to a T–S junction 306. The pulse supplied to the input terminal proceeds along the line 304 and enters the ring structure by means of the T-junction in the T–S junction 306. The pulse will circulate in a clockwise direction, since as was described previously the T-junction portion of the T–S junction 306 will not generate a backward pulse by reason of the fact that the S-junction portion is made refractory due to the passage of the pulse to the T-junction.

For exciting the ring structure in a manner to cause the pulse to circulate in a counterclockwise direction, structure bearing the same reference numerals as those described previously, except being primed, are employed. This will consist of an input terminal A′, connected to a line 304′, which couples to the ring structure 308 by a T–S junction 306′ in a direction to cause an input pulse to be injected into the ring structure for circulation in a counterclockwise direction.

As the clockwise circulating pulse circulates, it will pass a first T-junction 310, from which extends a line 312. Thereafter, the pulse passes a second T-junction 314, from which extends a line 316. Lines 312 and 314 are coupled by an S-junction 312S. The arrangement is such that the clockwise circulating pulse which enters line 312 will annihilate the clockwise circulating pulse which enters the line 316, since a head-on collision of these two pulses will occur in the S-junction 312S. Thus, no output is seen at terminal B′ when a clockwise pulse is circulating in the ring structure. When a counterclockwise pulse is circulating, then it will energize line 316 sufficiently before it energizes line 312, whereby the pulse on line 316 will pass by the S-junction 312S before a pulse reaches the S-junction from line 312. Thus, an output is achieved at terminal B′ for counterclockwise circulating pulses.

The structures associated with output terminal B are identical with the structures associated with output terminal B′, except for the opposite orientation of the T-junctions 318 and 320. As a result, the counterclockwise circulating pulse reaches an S-junction 322S over line 322 in time to annihilate a pulse injected into line 324 from T-junction 320. A clockwise circulating pulse is injected into line 324 sufficiently ahead of the injection into line 322 so that an output is obtained at terminal B and no annihilation occurs within the S-junction 322S.

Figure 28:
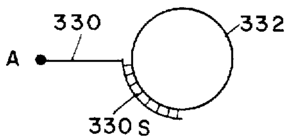
FIGURE 28 shows an arrangement for interrupting pulse circulation in a ring structure.

FIGURE 28 shows an arrangement for terminating circulation of a pulse within a ring structure. A pulse may be injected into terminal A which is at one end of a line 330. This line is coupled to the ring structure 332 by means of an S-junction 330S. Destruction of a pulse circulating in the ring structure 332 may be accomplished by properly timing the pulse applied over line 330 to the S-junction 330S, so that the S-junction is undergoing its refractory period at the time the circulating pulse enters this portion of the ring. If pulse timing for clearing is not desirable, then a sufficient number of pulses may be entered into the terminal A to insure the annihilation of the circulating pulse. It is a simple matter to compute the minimum length of S-junction and the number of pulses in conjunction with the size of a ring structure, to insure clearing of the ring structure by two pulses.

It may be noted that an N pulse generator can also be realized in the form in which a single pulse enters a circulating pulse into a storage ring, simultaneously generating a clearing pulse which is delayed in its application to the S structure for clearing the ring. Thus, the circulating pulse generates a uniform pulse train on the output, until some predetermined time later (e.g., N output pulses later), when the circulating pulse is annihilated. In this case, the output pulse train is uniform, For a relatively large N, the required accuracy of timing for turnoff in a ring structure is relatively great, compared to the arrangement shown in FIGURE 25, where the pulse train is not inherently uniform, but control of the exact number of pulses is straightforward.

The storage ring structure just described can be used in conjunction with any of the gate structures previously described, to provide time impulses for controlling these gates.

Figure 29:
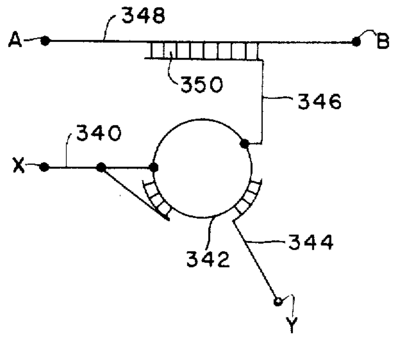
FIGURES 29 and 30 show arrangements for controlling a gate with a ring structure.

FIGURE 29 shows an arrangement for controlling a gate with a ring structure. The ring structure includes the input line structure 340, with input terminal X for injecting a pulse into the ring structure which will circulate in a clockwise direction around the line 342. The terminal Y is connected to clearing structure 344 of the type described in FIGURE 28, for clearing the ring structure. The gate structure is identical to the type described in FIGURE 21 and includes a first or control line 346, which has one end connected into a T-junction with the ring structure and the other end associated with the second or controlled line 348 through an S-junction 350.

A pulse applied to the terminal A at one end of the line 348 will travel to terminal B at the other end, unless a pulse from line 346 travels into the S-junction 350 to collide with and annihilate the pulse. The ring structure, once a pulse is injected via terminal X, can provide successive pulses to keep the line 348 blocked to the passage of a pulse, until a pulse applied to terminal Y terminates the further circulation of a pulse in the ring structure. It should be appreciated that the timing of the pulse derived from the ring structure must be such as to keep the same portion of the S-junction structure continuously in a refractory state, or timed to occur so that a pulse injected at terminal A will always collide with a pulse in the S-junction.

Figure 30:
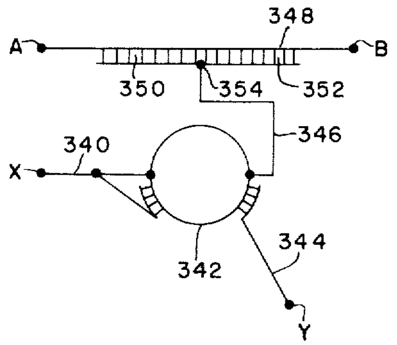

FIGURE 30 shows the identical structure of FIGURE 29, except that the line 346 now excites two S-junctions 350, 352 through a T-junction 354. With the additional S-junction 352, output pulses from the ring structure can prevent pulses from being transmitted in either direction along the line 348. With the structure shown in FIGURE 30, the line 348 can be blocked to the passage of all pulses, until the ring structure is cleared.

Figure 31:
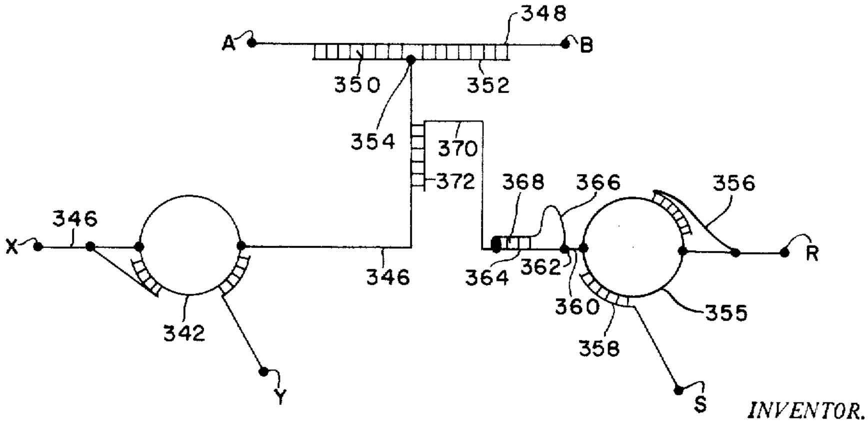
FIGURE 31 is a compound gate arrangement in accordance with this invention.

FIGURE 31 shows a compound gate structure wherein another ring structure 355 is coupled to the line 346 of the structure shown in FIGURE 30 to achieve a control over line 348, commonly used in logical functions. The ring 355, which has associated therewith similar input structure 356 and clearing structure 358 as ring structure 342, connects to an output line 360. The output line 360 connects to a T-junction 362. From T-junction 362, two lines 364, 366 of different lengths are extended to terminate in a T–S junction 368. As a result, for every pulse entering the T-junction 362, two pulses flow out of the T–S junction 368. The output of the T–S junction is applied to a line 370. This line is coupled to line 346 through an S-junction 372.

When neither ring structure 342 nor 354 are circulating pulses, then line 348 is unblocked, and pulses can travel between terminals A and B. When ring structure 342 alone is excited, no pulses can travel between terminals A and B, and the structures operate as described for FIGURE 30. When a pulse is applied to terminal R, ring structure 355 is excited and circulates a pulse. Lines 364 and 366 convert each circulating pulse to two pulses, which are applied through the T–S junction 368 and line 370 to the S–junction 372. This results in preventing any further pulses from ring 342 from reaching the S-junctions 350, 352. As a result, the gate is opened; that is, pulses can again flow along line 348.

In Boolean terminology, the gate control structure shown in FIGURE 31 may be expressed as $$T_{AB}=\overline{342}+355$$

or transmission between terminals A and B occurs when there are no pulses from ring 342 or there are pulses from ring 355.

There has been shown and described herein a novel and useful signal-propagating structural arrangement which can comprise either lumped or distributed elements. The structure of these elements is such that a line can be comprised of a plurality of these elements in signal-propagating relationship, each of these elements having the property that a threshold signal must be exceeded in order to afford signal-propagation therethrough; there is a refractory or energy-recovery interval following a propagation; the transmission of signals through a line composed of these elements is substantially attenuationless and at a substantially constant velocity. Only a few of the very many circuits and logical structures possible with this invention are shown. These are shown by way of illustration, and are not to be construed as a limitation upon the invention.

I claim:

1. A signal-propagation circuit comprising a bar of material having the properties of thermistor material, said bar having two opposite surfaces, a conductive film deposited on one of said surfaces, a plurality of adjacent conducting electrodes deposited on the other of said surfaces, a common connector to which said conducting electrodes are connected, a conductive sheet capacitively spaced from said plurality of electrodes, means connecting said conductive sheet and conductive film together, and means for applying a charging potential between said common connector and said conductive sheet.

2. A signal-propagation circuit as recited in claim 1 wherein said plurality of adjacent conducting electrodes comprise a thin conductive film deposited on said other of said surfaces, said film being sufficiently thin to have a resistance value in a direction extending from said other of said surfaces through said film which exceeds the value of resistance along said film in a direction parallel to said other of said surfaces.

3. A signal-propagation circuit comprising an envelope containing a gas, an elongated thin conductive film, a discharge electrode in the shape of a rod extending along and spaced from one side of said thin conductive film, a capacitor electrode extending along and capacitively spaced from the other side of said thin conductive film, means connecting said capacitor electrode and discharge electrode together, and means for applying a charging potential, insufficient to cause a discharge in said gas, between said thin conductive film and said capacitor electrode.

4. A signal-propagating circuit comprising a plurality of relays each having a relay coil and a pair of normally open contacts, a capacitor for each relay, means connecting one side of each said capacitor to one contact of a different one of said pairs of relay contacts, means connecting the other contact of each said pair of relay contacts to one end of the relay coil with which said other contact is operatively associated, a plurality of resistors a different one of which is connected between the one ends of a different two of said relay coils, means connecting all said other ends of said relay coils to all the other sides of said capacitors, and means for applying a charging potential across all said capacitors, whereby energization of any one of said relays causes a successive energization of succeeding relays, if any, and preceding relays, if any.

5. A signal-propagating circuit comprising a plurality of relays each having a relay coil and a single-pole double-throw contact including a swinger arm and a pair of contact terminals, said swinger arm being in contact with one of said pair of terminals when said relay is inoperative and in contact with the other of said terminals when said relay is operative, a capacitor for each relay connected between said swinger arm and one end of a relay coil, means connecting a different one of said other of said terminals with the other end of the relay coil with which it is operatively associated, a plurality of resistors a different one of which is connected between the other ends of a different two of said relay coils, and means for applying a charging potential across all said capacitors, whereby energization of any one of said relays causes a successive energization of succeeding relays, if any, and preceding relays, if any.

6. A signal-propagating circuit comprising a plurality of inductances, a plurality of tunnel diodes, means connecting a different one of said inductances in series with a different one of said diodes, a plurality of resistors, a different one of said resistors being connected between a different two of said diodes at the junction where they are connected to said inductances, and means for applying a potential across all said inductances and diodes for maintaining said diodes just below the nonlinear portion of their characteristics whereby an increase in potential applied to any one of said diodes causes a successive propagation of said increase in potential from one to the other of said diodes.

7. A signal-propagating circuit comprising a plurality of signal-propagating lines, each line including a plurality of elements each of which is in signal-propagating relationship with a succeeding element, each element having the properties that a minimum signal threshold must be exceeded before said element can propagate said signal, propagation through said element being substantially attenuationless, and said element having a refractory period before it can propagate again, and means for connecting at least three of said plurality of lines together for energizing for propagation of a signal along any two of said lines in response to a signal propagating along the third of said three lines.

8. A signal-propagating circuit as recited in claim 7 wherein said means for connecting at least three of said plurality of lines together for energizing for propagation of a signal along any two of said lines comprises placing an element in each of said three lines in signal-propagating relationship with each other.

9. A signal-propagating circuit comprising a plurality of signal-propagating lines, each line having a plurality of relays each having a relay coil and a pair of normally open contacts, a capacitor for each relay, means connecting one side of each said capacitor to one contact of a different one of said pairs of relay contacts, means connecting the other contact of each said pair of relay contacts to one end of the relay coil with which said other contact is operatively associated, a plurality of resistors a different one of which is connected between the one ends of a different two of said relay coils, means connecting all said other ends of said relay coils to all the other sides of said capacitors, and means for applying a charging potential across all said capacitors; and means for connecting any three of said plurality of lines together for energizing for propagation of a signal along any two of said lines in response to a signal propagating along the third of said lines comprising a first, second, and third resistor, means connecting said first resistor between the one end of a relay coil in one of said three lines and the one end of a relay coil in a second of said three lines, means connecting said second resistor between said one end of said relay coil in said one of said three lines and the one end of a relay coil in the third of said three lines, and means for connecting said third resistor between said one end of said relay coil in the second of said three lines with said one end of said relay coil in said third of said three lines.

10. A signal-propagating circuit comprising a plurality of signal-propagating lines, each line including a plurality of element means responsive to a minimum threshold signal for attenuationless propagation of a signal therethrough over a substantially constant interval with a refractory interval following propagation, each of said element means being in signal-propagating relationship with a succeeding element means, and means for interconnecting a portion of said lines to have a common refractory period.

11. A signal-propagating circuit comprising two signal-propagating lines each line including a plurality of elements each of which is in signal-propagating relationship with a succeeding element, each element including means for storing a predetermined amount of energy, means operable responsive to a signal exceeding a predetermined threshold and only when said predetermined amount of energy is stored for releasing said stored energy over a predetermined interval, means for applying a signal to said means operable for releasing said stored energy, and means for charging up said means for storing energy; and means for interconnecting some of the elements of two said lines for sharing in common their means for storing a predetermined amount of energy.

12. A signal-propagating circuit comprising a pair of signal-propagating lines, each line including a plurality of relays each having a relay coil and a pair of normally open contacts, a capacitor for each relay, means connecting one side of each said capacitor to one contact of a different one of said pairs of relay contacts, means connecting the other contact of each pair of relay contacts to one end of the relay coil with which said other contact is operatively associated, a plurality of resistors a different one of which is connected between the one ends of a different two of said relay coils, means connecting all said other ends of said relay coils to all the other sides of said capacitors, means for applying a charging potential across all said capacitors, and means for connecting a plurality of successive capacitors in one line in parallel with the respective successive capacitors in another line.

13. A signal-propagating circuit comprising a pair of signal-propagating lines having separate portions and a common energy sharing portion, each of said lines having a plurality of elements each of which includes a relay having a relay coil and a pair of normally open contacts, means connecting one contact of said relay to one end of the relay coil of said relay, a source of charging potential, means connecting said source of charging potential to the other contact of said relay, and a different resistor connecting said one end of each relay coil of an element to the one end of the relay coil of a succeeding element, each element in said separate portions of said lines having a capacitor connected between said source of charging potential and the other end of the relay coil of said element, and a common capacitor for two elements one of said two elements being in one of said lines in said common energy sharing portion, the other of said two elements being in the other of said lines in said common energy sharing portion, said common capacitor being connected between the source of charging potential for said two elements and the other ends of the relay coils of said two elements.

14. A signal-propagating network comprising three signal-propagating lines, each line including a plurality of element means responsive to a minimum threshold signal for attenuationless propagation of a signal therethrough over a substantially constant interval with a refractory interval following propagation, each of said element means being in signal-propagating relationship with a succeeding element means, means for interconnecting a portion of two of said lines to have a common refractory period, and means for placing an element in each of said three lines in signal-propagating relationship with each other.

15. A signal-propagating network as recited in claim 14 wherein one of said two lines connected to have a common refractory period terminates after said connection.

16. A signal-propagating network as recited in claim 14 wherein said means for placing an element means in each of said three lines in signal-propagating relationship with each other is located a number of element means away from said means for interconnecting a portion of two of said lines to have a common refractory period sufficient to permit said common refractory period to elapse before a signal traveling along said lines from said means for placing an element means can reach said means for interconnecting.

17. A signal-propagating network as recited in claim 14 wherein said means for placing an element means in each of said three lines in signal-propagating relationship with each other is located a number of element means away from said means for interconnecting a portion of two of said lines to have a common refractory period less than sufficient to permit said common refractory period to elapse before a signal traveling along said lines from said means for placing can reach said means for interconnecting.

18. A signal-propagating circuit comprising a plurality of signal-propagating lines, each line including a plurality of element means responsive to a minimum threshold signal for attenuationless propagation of a signal therethrough over a substantially constant interval with a refractory interval following propagation, each of said element means being in signal-propagating relationship with a succeeding element means, and means for interconnecting a portion of said lines to have a common refractory period, one of said lines terminating at the end of its said portion which is interconnected to have a common refractory period with a portion of the other of said lines.

19. A pulse-train generator circuit having a pulse input terminal, a pulse-train output terminal, an input line having one end connected to said pulse input terminal, said line being made up of a plurality of element means responsive to a minimum threshold signal for attenuationless propagation of a signal therethrough over a substantially constant interval with a refractory interval following propagation, each of said element means being in pulse-propagating relationship with a succeeding element means, means for coupling to said input line as many intermediate lines as there are pulses desired in a pulse train, said intermediate lines having the same structure as said input line, said intermediate lines being grouped in pairs, one line in a pair being longer than the other, means for coupling to each said pair of lines another line, said another line having the same structure as said input line, a remaining intermediate line if any, extending to the end of and being paired with one of said another lines, means coupling all said another lines to a single output line for successively driving said single output line, said single output line having the same structure as said input line, and means coupling said output line to said pulse-train output terminal.

20. A pulse-train generator circuit as recited in claim 19 wherein said means for coupling to said input line as many lines as there are pulses desired in a pulse train include a separate coupling line for each of said lines except the first and last each said coupling line having the same structure as said input line, means for coupling one element of a first of said coupling lines and a first of said lines in propagating relationship with said input line, each of said coupling lines having an element on the end thereof in propagating relationship with an element on the end of a different one of said coupling lines and on the end of a different one of said lines.

21. A pulse circulator comprising a pulse input terminal, an output terminal, a ring structure made up of a plurality of element means responsive to a minimum threshold signal for attenuationless propagation of a signal therethrough over a substantially constant interval with a refractory interval following propagation, each of said element means being in propagating relationship with a succeeding element means, means for coupling said pulse input terminal to said closed ring structure for injecting a pulse into said closed ring structure, and means for coupling said closed ring structure to said output terminal for applying an output pulse thereto.

22. A pulse circulator as recited in claim 21 wherein said means for coupling said pulse input terminal to said closed ring structure for injecting a pulse into said closed ring structure comprises three lines each made of a plurality of element means each of which is in propagating relationship with a succeeding element, said elements having the same properties as those of said ring structure, a first of said lines having one end operatively coupled to said input terminal, means coupling an element in the other end of said first of said lines with an element means at one end of the second of said lines, means coupling an element means at the other end of the second of said lines with an element means at one end of the third of said lines, and means for coupling element means of said third of said lines with element means of said ring structure for having a common refractory period.

23. A pulse circulator as recited in claim 21 wherein said means for coupling said pulse input terminal to said closed ring structure for injecting a pulse into said closed ring structure comprises a line made of a plurality of element means each of which is in propagating relationship with two adjacent element means, said element means having the same properties as those of said ring structure, one end of said line being operatively coupled to said input terminal, means for coupling the last element means at the other end of said line in propagating relationship with an element means in said ring, and means for coupling for having a common refractory period element means preceding said last element means in said line with element means in said ring structure adjacent the one coupled to the last element means in said line.

24. A pulse circulator as recited in claim 21 wherein said means for coupling said closed ring structure to said output terminal for applying an output pulse thereto comprises a first and second line each made of a plurality of element means, each of said element means being in signal-propagating relationship with two adjacent element means, each element means having the same properties as those of said ring structure, means for operatively coupling an element means in one end of said first line propagating relationship with an element means in said ring structure, means coupling the other end of said first line to said output terminal, means for operatively coupling one end of said second line to another element means in said ring structure, and means for coupling for having a common refractory period element means at the other end of said second line with element means along said first line.

25. In combination a gate and a pulse source for controlling said gate, said gate comprising a first and second line, an input terminal at one end of said first line, an output terminal at the other end of said first line, said first and second line each being made from a plurality of element means responsive to a minimum threshold signal for attenuationless propagation of a signal therethrough over a substantially constant interval with a refractory interval following propagation, each of said element means being in signal-propagating relation with a succeeding element means, and means coupling a portion of said second line with a portion of said first line for having a common refractory period, said pulse source comprising a ring structure having a plurality of sequentially arranged element means in signal-propagating relation ship with each other, said element means having the same properties as an element means of said first or second line, and means for coupling an element means at the other end of said second line to an element means in said ring structure to be in propagating relation therewith.

26. In combination a gate and a pulse source for controlling said gate as recited in claim 25 wherein said pulse source includes a second ring structure having substantially the same structure as said ring structure, a third line having the same structure as said first and second lines, means coupling a portion of said third line with a portion of said second line for having a common refractory period, and means for coupling for excitation an element means at one end of said third line with an element means in said ring structure.

(References on following page)

References Cited by the Examiner

UNITED STATES PATENTS

| | | | |
|---|---|---|---|
| 2,373,624 | 4/1945 | Zinn | 178—44 |
| 2,427,533 | 9/1947 | Overbeck | 307—88.5 |
| 2,585,571 | 2/1952 | Mohr | 178—44 |
| 2,808,471 | 10/1957 | Poucel et al. | 307—88.5 |
| 2,917,716 | 12/1959 | Mura et al. | 328—61 |
| 2,944,164 | 7/1960 | Odell et al. | 307—88.5 |
| 2,964,658 | 12/1960 | Bocast | 307—106 |
| 3,022,472 | 2/1962 | Tenenbaum et al. | 307—88.5 |
| 3,038,085 | 6/1962 | Wallmark et al. | 307—88.5 |
| 3,050,637 | 8/1962 | Kaufman | 307—88.5 |
| 3,070,711 | 12/1962 | Marcus et al. | 307—88.5 |
| 3,079,571 | 2/1963 | Elliott et al. | 307—88.5 |
| 3,097,349 | 7/1963 | Putzrath et al. | 340—172.5 |
| 3,107,308 | 10/1963 | Hogue | 307—88.5 |

OTHER REFERENCES

Pages 161–163, 1960, G. E. Transistor Manual.

Pages 225–232, 1951, Keister et al., Design of Switching Circuits, Van Nostrand.

Pages 962–963, Apr. 10, 1959, Harmon, "Artificial Neuron," Science, vol. 129, No. 3354.

Pages 304–308, 1959, Kamentsky, "Pattern and Character Recognition Systems," Proceedings of the Western Joint Computer Conference.

ROBERT C. BAILEY, *Primary Examiner.*

ORIS L. RADER, MALCOLM A. MORRISON, *Examiners.*